United States Patent [19]

Lombardo

[11] Patent Number: 5,020,070

[45] Date of Patent: May 28, 1991

[54] GAS LASER

[75] Inventor: Igino Lombardo, Sharon, Mass.

[73] Assignee: I. L. Med., Inc., Walpole, Mass.

[21] Appl. No.: 450,580

[22] Filed: Dec. 14, 1989

[51] Int. Cl.[5] .............................................. H01S 3/03
[52] U.S. Cl. ................................. 372/65; 372/34; 372/107; 372/55
[58] Field of Search ................ 372/34, 61, 35, 107, 372/65, 55, 92

[56] References Cited

U.S. PATENT DOCUMENTS

| | | | |
|---|---|---|---|
| 3,784,927 | 1/1974 | Rudolph | 372/65 |
| 3,898,586 | 8/1975 | Nelson et al. | 331/94.5 G |
| 4,203,080 | 5/1980 | Wright et al. | 372/65 |
| 4,228,406 | 10/1980 | Lewis et al. | 331/94.5 D |
| 4,553,241 | 11/1985 | Chaffee | 372/62 |
| 4,644,554 | 2/1987 | Siteng | 372/65 |
| 4,683,575 | 7/1987 | Carlson et al. | 372/59 |
| 4,694,463 | 9/1987 | Hirth et al. | 372/61 |
| 4,696,011 | 9/1987 | Kearsley | 372/61 |
| 4,723,254 | 2/1988 | Turner | 372/59 |
| 4,752,936 | 6/1988 | Gerhardt | 372/62 |
| 4,759,027 | 7/1988 | Hahn et al. | 372/61 |
| 4,764,932 | 8/1988 | Peterson et al. | 372/35 |
| 4,866,726 | 9/1989 | Ortiz et al. | 372/65 |

*Primary Examiner*—Léon Scott, Jr.
*Attorney, Agent, or Firm*—Weingarten, Schurgin, Gagenbin & Hayes

[57] ABSTRACT

A compact laser includes an inner quartz tube defining a central bore coaxially disposed within an outer quartz tube sealed with respective end cap assemblies. Each end cap assembly is bonded to a respective end of the outer quartz tube and includes an electrode which at least partially surrounds or is proximate to a corresponding end of the inner quartz tube. Each end cap assembly also supports a mirror element and includes means for adjusting the angular orientation of the mirror elements to bring them into mutually parallel optical relationship. An opening is provided at at least one end of the inner tube proximate to the corresponding electrode which serves to provide a path of lower resistance to direct the region of gas discharge away from the mirror element so that the resulting sputtering is substantially restricted to a region that does not contain the mirror element. The end cap assemblies are fabricated of one or more materials which are thermally compatible and bondable with quartz. The invention provides means for safeguarding the mirror elements against sputtering of material from the electrodes; means for providing a very compact and stable laser which does not employ an external resonator; and compact means for adjusting the laser mirrors.

18 Claims, 6 Drawing Sheets

GAS LASER

FIELD OF THE INVENTION

This invention relates to gas lasers and more particularly to a laser tube structure for a gas laser.

BACKGROUND OF THE INVENTION

In a gas laser that uses direct current to excite a gaseous laser medium contained therein, an electrical discharge is produced due to a flow of direct electric current through the laser medium. High current densities associated with the electrical discharge create a hot ionized plasma. This high heat, along with the high current density, causes sputtering the tube wall and electrode material. Sputtering in a process by which atoms or molecules are ejected from the surface of a material by bombardment with energetic ions. Sputtering causes material to be eroded from the inner surface of the laser electrodes, introducing contaminants into the laser gas, and contaminating the optics in the vicinity of the cathode, resulting in excessive optical losses and decreased laser life. Problems due to sputtering tend to increase in severity with increases of current density in the inner tube.

To avoid contamination of the optics, external resonators have been used that enclose the gas lasing medium within a tube sealed with windows mounted at Brewster's angle at each end. The tube is supported in a structure that also supports two confronting mirrors disposed outside and on the longitudinal axis of the sealed tube. Thus, the mirrors are protected from sputtering processes within the tube, but at the expense of including an external support structure that adds to the size and complexity of the overall laser apparatus.

It is also known to isolate the cathode in a side-arm tube connected to the central bore of a laser tube so that the path of the electrical discharge does not pass near the optics. However, since the side-arm tube is typically of the same diameter as the central bore, the resulting structure is cumbersome and does not lend itself to the degree of miniaturization achieved by the invention.

SUMMARY OF THE INVENTION

A compact laser according to the invention includes an inner quartz tube defining a central bore and coaxially disposed within an outer quartz tube that is sealed with respective end cap assemblies. Each end cap assembly is bonded to a respective end of the outer quartz tube and includes an electrode which at least partially surrounds or is proximate to a corresponding end of the inner quartz tube. Each end cap assembly also supports a mirror element and includes means for adjusting the angular orientation of the mirror elements to bring them into mutually parallel optical relationship. An opening is provided at at least one end of the inner tube proximate to the corresponding electrode which serves to provide a path of lower resistance that directs the region of gas discharge away from the mirror element so that the resulting sputtering is substantially restricted to a region that does not contain the mirror element. The deleterious effects of sputtering are substantially reduced in this fashion, and the lifetime of the tube is extended. The end cap assemblies are fabricated from one or more materials which are thermally compatible with quartz, at least one of which is bondable to quartz. In a preferred embodiment the end-cap assemblies each include an end-cap fabricated from INVAR and include mounting elements for retaining a mirror element and means for adjusting its angular orientation. A first end of a molybdenum sleeve is bonded to the end cap and a second end of the sleeve is bonded to the confronting end of the outer quartz tube. The end cap is also bonded to an electrode. The use of INVAR and molybdenum in conjunction with quartz provides a laser tube structure that exhibits a low thermal expansion characteristic compatible with that of quartz, thereby facilitating precise optical alignment, and promoting enhanced tube lifetime and reliability. This integral structure allows for a thermally stable laser that is capable of withstanding significant temperature changes, with little effect on the alignment of the laser mirrors. In this fashion, the invention achieves a compact laser with outside dimensions that are significantly smaller than lasers using glass-to-metal graded seals or other techniques known in the art.

Since the deleterious effects of sputtering are substantially reduced, the lifetime of the tube is further increased.

BRIEF DESCRIPTION OF THE DRAWINGS

The invention will be more fully understood by reading the following detailed description, in conjunction with the accompanying drawings, in which.

DETAILED DESCRIPTION OF THE INVENTION

Figures 1, 1A:
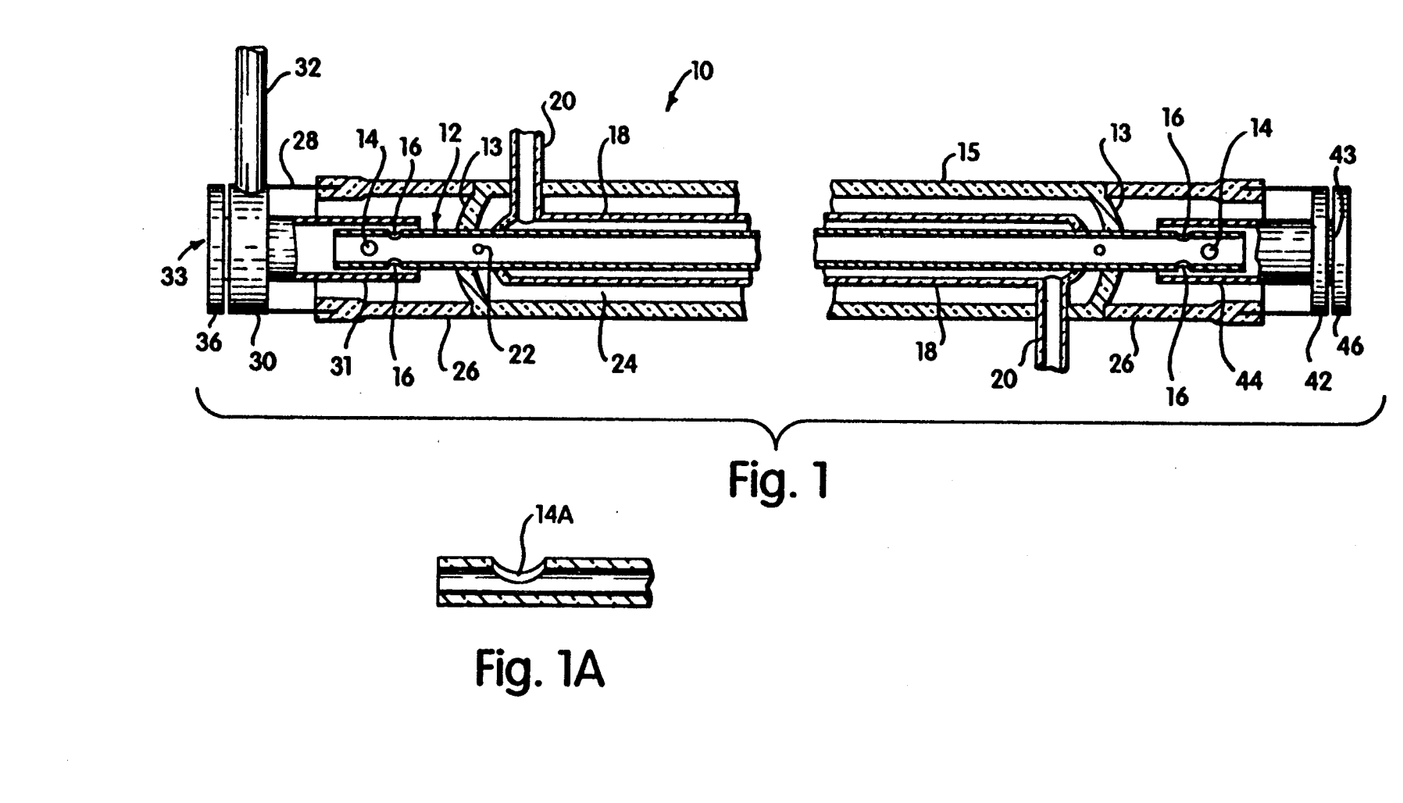
FIG. 1 is a front view with elements in partial cutaway view of the laser tube of the invention.
FIG. 1A is front view of the left side of an alternate embodiment of a central bore.

Referring to FIG. 1 there is shown a preferred embodiment 10 of the invention which includes an inner tube 12 of quartz defining a central bore, and disposed coaxially within an outer tube 15, also of quartz. The inner tube 12 is supported within the outer tube 15 by quartz end walls 13 which define an annular region 24 between the tubes 12 and 15. A quartz sleeve 26 is bonded to each end of outer tube 15 and provides an extension of the outer tube around the end portions of tube 12 and is substantially coextensive therewith. An end cap assembly 33 is bonded to each available end of the sleeves 26 to close the tube structure. Two pairs of holes 14 and 16 are provided in tube 12 at each end, the pairs being arranged as shown in symmetrical axially offset disposition. The holes 14 are orthogonal to the holes 16 and axially offset therefrom. In an alternative embodiment, a shown in FIG. 1A, a single hole 14A can be disposed in the wall of tube 14 confronting the surrounding electrode 31. The tube 12 is surrounded by a cooling sleeve 18 over a portion of its length. The cooling sleeve 18 has two coolant exchange ports 20 at opposite ends. A coolant, such as Fluorinert, is pumped into one of the ports 20 and flows over the outer surface of the tube 12 to carry away heat, and the coolant exits via the other port 20. The tube 12 also has a pair of gas ports 22, typically disposed 180 degrees apart, to connect the central bore within tube 12 to the ballast region 24 that contains an additional supply of gas to replace the gas within the central bore that is consumed in the lasing process.

In the preferred embodiment, the nominal overall length of the laser 10 is about 500 mm, and the nominal overall width is about 26 mm, providing a nominal power output of 24 watts. The tube 12 has an inner diameter of 6 mm, and an outer diameter of 8 mm, for example. The central outer tube 15 has a typical inner diameter of 22 mm and an outer diameter of 26 mm. The cooling sleeve 18 is also a quartz tube, and has a typical inner diameter of 10 mm and a typical outer diameter of 12 mm. The ports 20 are made of quartz, typically with an outer diameter of 4 mm and a thickness similar to the thickness of the cooling sleeve 18. Quartz is chosen for its ability to withstand high temperature, its good electrical insulation, its good mechanical strength, and its low thermal expansion coefficient.

The end cap assemblies 33 are, in the illustrated embodiment, substantially identical and are operative to seal the tube structure and to provide means for adjustably mounting the mirror elements 48 (not shown in FIG. 1). With reference to FIGS. 1 and 2B the end cap assembly 33 includes an end cap having a first annular portion 30 and a second annular portion 36 joined by an intermediate section 34. A sleeve 28 extends from annular portion 30 and is sealed to the quartz sleeve 26. In the illustrated embodiment, the quartz sleeve 26 terminates in a thickened portion 27 which includes a coaxial cylindrical groove that receives the sleeve 28 and is sealed thereto in gas-impervious relationship so as to provide a sealed structure. In the illustrated embodiment, the sleeve 28 is made of molybdenum and the end cap is made of IVNAR-36. The end cap assembly can be fabricated from other materials having a low thermal expansion coefficient and the capacity of being bonded to quartz. The end cap assembly can be made from two or more different materials as above, or can be formed of a single material having the requisite thermal expansion characteristics and quartz bonding characteristics.

With reference to FIG. 1, a coaxial tubular anode 31 is bonded to the end cap portion 30 and extends around the confronting end portion of tube 12 that is contiguous with the pairs of openings 14 and 16. The anode is typically made from INVAR. A fill tube 32 is operative to introduce a lasing gas into the central bore of tube 12. The fill tube 32, typically fabricated of copper, is bonded to the periphery of end cap portion 30 and is coupled to a radial opening (not shown) through the end cap portion.

Figure 2A:
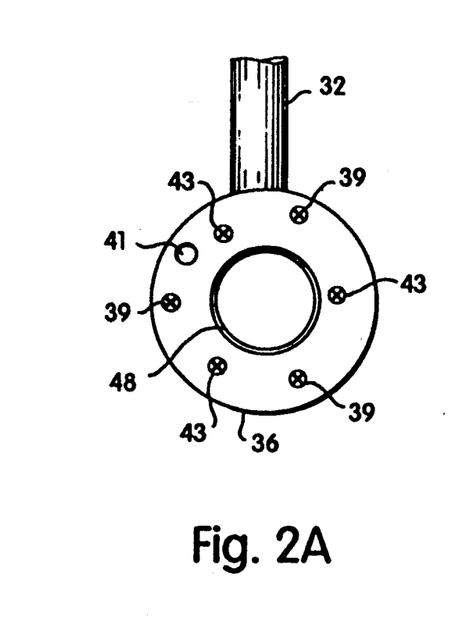
FIG. 2A is an end view of the left portion of the laser tube taken along the line 2A—2A of FIG. 2B.
Figure 2B:
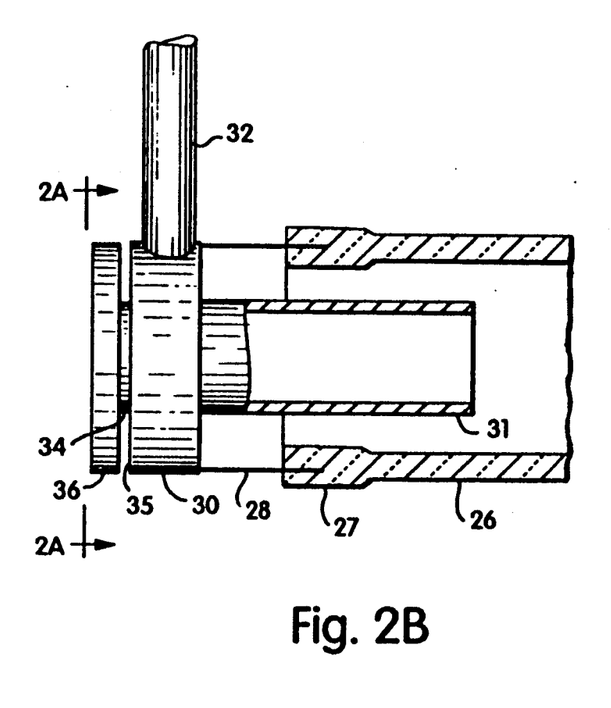
FIG. 2B is a front view of the left portion of the laser tube.
Figure 3A:
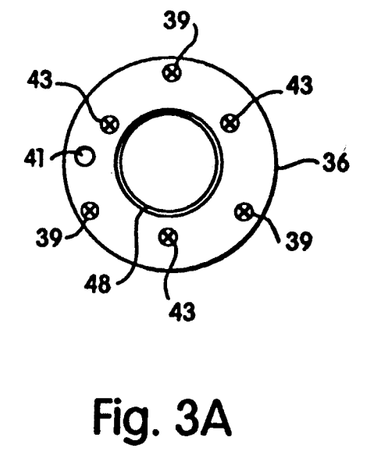
FIG. 3A is an end view of the right portion of the laser tube taken along the line 3B—3B of FIG. 3B.
Figure 3B:
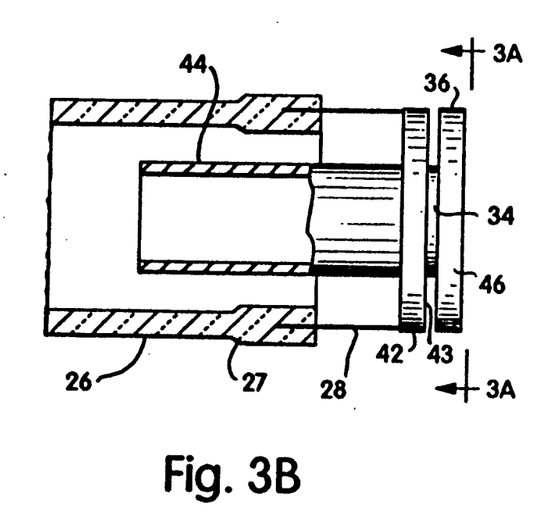
FIG. 3B is a front view of the right portion of the laser tube.

Referring to FIG. 2A, electrical connection to the end cap can be made via a hole 41 drilled or otherwise provided in the end cap portion 36 which is cooperative with a mating connector. Electrical connection can alternatively be made to the end cap by any other convenient means.

Figure 4A:
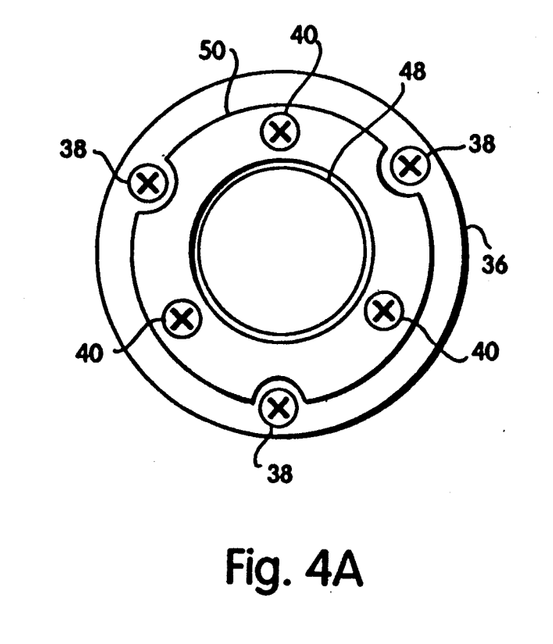
FIG. 4A is an end view of the left portion of the laser tube taken along the line 4B—4B of FIG. 4B.
Figure 4B:
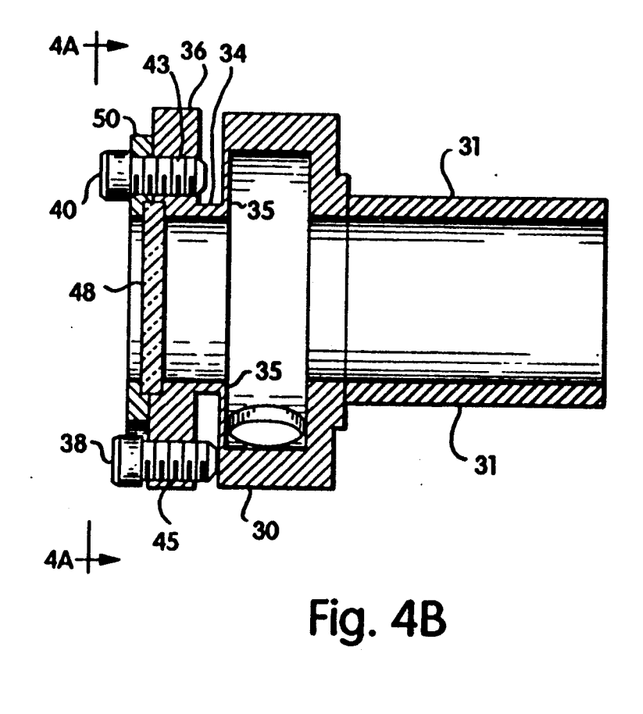
FIG. 4B is a front view of the left portion of the laser tube.

A mirror element 48 is disposed within a recess in end cap portion 36 and is retained therein by an annular washer 50, as best shown in FIGS. 4A and 4B. The washer 50 is secured to end cap section 36 by machine screws 40 and cooperative threaded openings 43. The retaining screws 40 do not extend out from section 36 by any appreciable amount so that they do not interfere with the adjustability of the end cap, as will be described.

The optical alignment of the mirror 48 can be adjusted at each end cap assembly. As shown in FIGS. 4A and 4B, three symmetrically spaced machine screws 38 extend through threaded openings 39 in section 36 and abut the confronting peripheral wall of section 30. Tightening or loosening of the adjustment screws 38 will cause deformation of the relatively thin wall 35 of section 30 and angular adjustment of the plane of mirror 48. By appropriate adjustment of the screws 38 at each end cap assembly, the mirrors 48 can be brought into intended parallel alignment. In the prior art, the mirror adjustment is typically carried out by deforming a sturcture similar to section 34 in the presence or absence of adjusting screws similar to 40. This art is not workable in the miniaturized laser of the invention.

The cathode end cap assembly is substantially the same as the anode assembly previously described. The electrode 44 in this case is the cathode electrode. This cathode assembly does not include a fill port and is otherwise of substantially the same construction as described above.

An important aspect of the novel laser in accordance with the invention is the minimization of the deleterious effects of sputtering which occurs within the tube.

Figure 5:
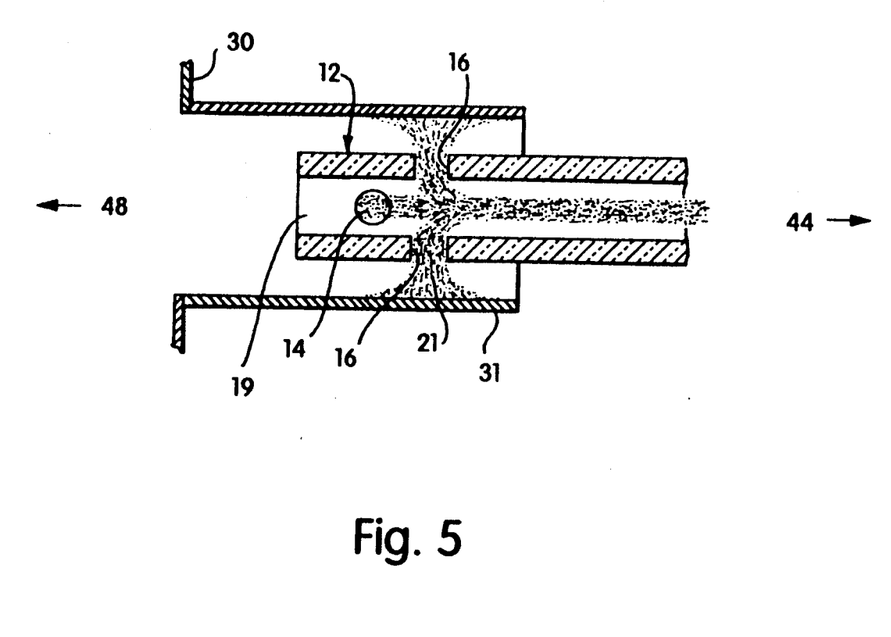
FIG. 5 shows a path of gas discharge at an end of the laser tube.

Electrical resistance in a medium is cumulative over a path through that medium. Therefore, the path of least resistance in a substantially homogeneous medium is also the shortest path. Since the lasing medium of the invention is substantially homogeneous, the gas discharge current spontaneously favors the path of least resistance, i.e., the shortest path between the two electrodes 31 and 44. Referring to FIG. 5, the pairs of holes 14 and 16 at each end of the inner tube 12 provide a path of least resistance, and serve to guide a region of gas discharge 21 away from the mirror elements 48. In this way, the mirror elements 48 are exposed to less heat and discharge current. One or more endwalls 13 also serve to prevent an electrical discharge from traversing the distance between electrodes 31 and 44 in a region 24 external to the inner tube 12. Electrodes 31 and 44 can have geometries other than cylindrical, as it will be obvious to those skilled in the art.

The pairs of holes 14, 16 also function to direct the gas discharge current 21 so that the resultant sputtered material is not ejected generally towards either mirror element 48. Thus, the pairs of holes 14, 16 also serves to direct the gas discharge 21 so that the resulting sputtering is substantially resticted to a region that does not contain a mirror element 48.

The pairs of holes 14, 16 are positioned so that a portion 19 of the central bore of inner tube 12 is disposed between the pairs of holes 14, 16 and the mirror element 48, serving to shield the mirror element 48 from sputtered particulate matter. Protecting the mirror element 48 in this manner decreases its rate of contamination and corrosion, thereby enhancing the performance and extending the operating life of the laser tube of the invention.

Since significant sputtering occurs primarily near the cathode 44 of the laser tube of the invention, only one or more pairs of holes disposed near the cathode 44 are necessary to practice the invention. However, manufacturing and assembly of the laser tube is simplified by providing symmetrical holes at each end.

Figure 1B:
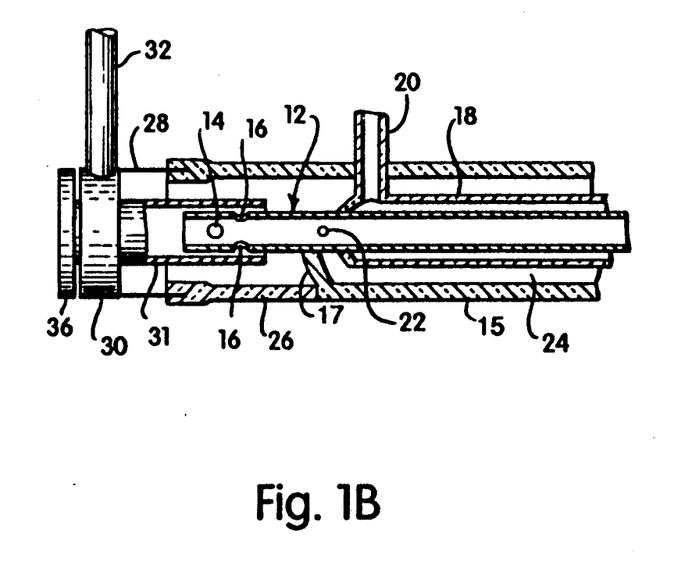
FIG. 1B is a front view of the left side of an alternate embodiment that includes a strut.

The novel laser need not include both end walls 13 as shown in FIG. 1. In an alternative embodiment, shown in FIG. 1B, one of the end walls 13 is replaced by one or more struts 17 between the inner and outer tubes 12 and 15 to support the inner tube 12. In this embodiment, an additional supply of lasing gas within region 24 can communicate with the region generally enclosed by the inner tube 12.

Other modifications and implementations will occur to those skilled in the art without departing from the spirit and the scope of the invention as claimed. Accordingly, the above description is not intended to limit the invention except as indicated in the following claims.

What is claimed is:

1. A gas laser comprising:
  an outer quartz tube including two end cap assemblies fashioned from one or more materials, each characterized by a low thermal expansion coefficient that is substantially compatible with the thermal expansion coefficient of quartz;
  two mirror elements, disposed coaxially and secured respectively by said end cap assemblies;
  inner tube support means disposed within said outer tube;
  an inner tube coaxially disposed between said mirror elements, and supported by said inner tube support means;
  cooling means in thermally coupled relation with a central portion of said inner tube; and
  a pair of electrodes, each electrode proximate to a respective end of said inner tube.

2. The gas laser of claim 1 wherein said inner tube comprises at least one opening at one end, wherein said opening is positioned such that a portion of the inner tube is disposed between said opening and a mirror element, serving to substantially shield the mirror element from sputtered particulate matter.

3. The gas laser of claim 1 wherein said inner tube comprises at least one opening at each end, wherein said openings are disposed such that a portion of the inner tube is disposed between said opening and a mirror element, serving to substantially shield the mirror element from sputtered particulate matter.

4. The gas laser tube of claim 1, wherein said outer quartz tube further comprises:
  a quartz central portion; and
  a quartz sleeve possessing a first end that terminates in an annular portion which includes a coaxial circular groove operative to receive a first end of a coaxial sleeve, said first end of said coaxial sleeve being bondable to and sealable with said first end of said quartz sleeve, wherein a second end of said quartz sleeve is in fused relationship with said quartz central portion,
  and wherein said end cap assembly further comprises:
  a coaxial sleeve fashioned from a material with a thermal expansion coefficient compatible with quartz, and capable of bonding to quartz, a second end of said coaxial sleeve being in bonded relationship with a portion of said end cap assembly, and said first end of said coaxial sleeve being in bonded and sealed relationship with said first end of said quartz sleeve.

5. The gas laser tube of claim 4 wherein said coaxial sleeve is fashioned from molybdenum.

6. The gas laser tube of claim 1, wherein said outer tube further comprises:
  a quartz central portion; and
  a quartz sleeve possessing a first end that terminates in an annular portion which includes a coaxial circular groove operative to receive an end of a unified coaxial extension of said end cap assembly, wherein said extension is made of the same material as another portion of said end cap assembly, and is bondable and sealable with the first end of said quartz sleeve, and a second end being in fused relationship with said quartz central portion,
  and wherein said end cap assembly further includes a unified coaxial extension of a portion of said end cap assembly made of the same material as said portion, and in bonded and sealed relationship with said first end of said quartz sleeve.

7. The gas laser of claim 1, wherein each of said electrodes is in bonded relationship with a portion of a corresponding end cap assembly.

8. The gas laser tube of claim 1, wherein a portion of one of said end cap assemblies is adapted to receive a copper fill tube for introducing a lasing gas into at least said inner tube.

9. The gas laser tube of claim 8, wherein said copper fill tube is bonded to the periphery of a hole in said portion of said end cap assembly.

10. The gas laser tube of claim 1, wherein said end cap assemblies each comprise:
  a holding portion adapted to hold one of said mirror elements;
  an electrode portion with a first end that includes a flexible wall with a window, and a second end that includes a rigid wall with a window, said rigid wall being in bonded relationship with an electrode;
  a coaxial connecting segment in bonded coaxial relationship with said flexible wall, and in bonded coaxial relationship with said holding portion; and
  a plurality of mirror alignment elements in contact with said holding portion and said electrode portion, and adapted to adjust the angular orientation of the holding portion with respect to the electrode portion.

11. The gas laser tube of claim 10, wherein said mirror alignment elements are fashioned from INVAR.

12. A gas laser comprising:
  an outer quartz tube including:
    a quartz central portion; and
    a quartz sleeve possessing a first end that terminates in an annular portion which includes a coaxial circular groove operative to receive a first end of a coaxial sleeve, said first end of said coaxial sleeve being bondable and sealable with said first end of said quartz sleeve, and a second end in fused relationship with said quartz central portion;
  two end cap assemblies fashioned from one or more materials characterized by a thermal expansion coefficient similar to that of quartz, each assembly including a coaxial sleeve fashioned from a material that is also capable of chemically bonding to quartz, said coaxial sleeves each possessing a first end in bonded relationship with another portion of one of said end cap assemblies and a second end in bonded and sealed relationship with a first end of said quartz sleeve;
  two mirror elements, disposed coaxially and secured respectively by said end cap assemblies;

inner tube support means disposed within said quartz tube;

an inner tube coaxially disposed between said mirror elements, and supported by said inner tube support means, wherein said inner tube comprises at least one opening at each end, each opening being positioned such that a portion of the inner tube is disposed between said opening and one of said mirror elements;

cooling means in thermally coupled relation with a central portion of said inner tube; and a pair of electrodes, each electrode proximate to a portion of a respective end of said inner tube.

13. The gas laser tube of claim 12, wherein said end caps each further comprise:

a holding portion adapted to hold one of said mirror elements;

an electrode portion with a first end that includes a flexible wall with a window, and a second end that includes a rigid wall with a window, said rigid wall being in bonded relationship with an electrode;

a coaxial connecting segment in bonded coaxial relationship with said flexible wall, and in bonded coaxial relationship with said holding portion; and a plurality of mirror alignment elements in contact with said holding portion and said electrode portion, and adapted to change the angular orientation of the holding portion with respect to the electrode portion.

14. The gas laser of claim 12 wherein said end caps are fashioned from INVAR, and said coaxial sleeve is fashioned from molybdenum.

15. A gas laser comprising:

a quartz outer tube including:

a quartz central portion; and a quartz sleeve possessing a first end that terminates in an annular portion which includes a coaxial circular groove operative to receive a first end of a coaxial sleeve, said first end of said coaxial sleeve being sealable and bondable with said first end of said quartz sleeve, and a second end in fused relationship with said quartz central portion;

two end caps fashioned from INVAR, each further including a coaxial sleeve fashioned from molybdenum, a first end of each coaxial sleeve being in bonded relationship with one of said end caps;

two mirror elements, disposed coaxially and secured respectively by said end caps;

inner tube support means disposed within said quartz tube;

an inner tube coaxially disposed between said mirror elements, and supported by said inner tube support means, wherein said inner tube comprises at least one opening at each end, each opening being positioned such that a portion of the inner tube is disposed between said opening and a mirror element;

cooling means in thermally coupled relationship with a central portion of said inner tube; and a pair of electrodes, each electrode proximate to a portion of a respective end of said inner tube.

16. The gas laser tube of claim 15, wherein said end cap assemblies each comprise:

a holding portion adapted to hold one of said mirror elements;

an electrode portion with a first end that includes a flexible wall with a window, and a second end that includes a rigid wall with a window, said rigid wall being in bonded relationship with an electrode;

a coaxial connecting segment in bonded coaxial relationship with said flexible wall, and in bonded coaxial relationship with said holding portion; and a plurality of mirror alignment elements in contact with said holding portion and said electrode portion, and adapted to adjust the angular orientation of the holding portion with respect to the electrode portion.

17. The gas laser of claim 16, wherein said mirror alignment elements are fashioned from INVAR.

18. A gas laser comprising:

an outer quartz tube including:

a central quartz portion; and a quartz sleeve possessing a first end that terminates in an annular portion which includes a coaxial circular groove operative to receive a first end of a coaxial sleeve, said first end of said coaxial sleeve being bondable and sealable with said first end of said quartz sleeve, and a second end in fused relationship with said central quartz portion;

two end cap assemblies fashioned from INVAR, wherein said end cap assemblies each comprise:

a coaxial sleeve fashioned from molybdenum possessing a first end in bonded and sealed relationship with a first end of said quartz sleeve;

a holding portion adapted to hold one of said mirror elements;

an electrode portion with a first end that includes a flexible wall with a window, and a second end that includes a rigid wall with a window, said rigid wall being in bonded relationship with an electrode, and in bonded relationship with a second end of said coaxial sleeve;

a coaxial connecting segment in bonded coaxial relationship with said flexible wall, and in bonded coaxial relationship with said holding portion; and a plurality of INVAR mirror alignment elements in contact with said holding portion and said electrode portion, and adapted to change the angular orientation of the holding portion with respect to the electrode portion;

two mirror elements, disposed coaxially and secured respectively by said end cap assemblies;

inner tube support means disposed within said outer quartz tube;

an inner tube coaxially disposed between said mirror elements, and supported by said inner tube support means, wherein said inner tube comprises at least one opening at one end, said opening being positioned such that a portion of the inner tube is disposed between said opening and a proximate mirror element;

cooling means in thermally coupled relationship with a central portion of said inner tube; and a pair of electrodes, each electrode proximate to a portion of a respective end of said inner tube.

* * * * *